United States Patent [19]

Erb

[11] 4,225,640

[45] Sep. 30, 1980

[54] METHOD OF RECLAIMING THERMOPLASTIC MATERIALS FROM MUNICIPAL WASTE AND PRODUCT PRODUCED THEREBY

[75] Inventor: Robert A. Erb, Valley Forge, Pa.

[73] Assignee: Redmar Investors, Inc., New York, N.Y.

[21] Appl. No.: 902,850

[22] Filed: May 4, 1978

[51] Int. Cl.² ............................................. B32B 27/18
[52] U.S. Cl. ...................................... 428/2; 156/62.2; 264/122; 264/123; 264/126; 264/DIG. 59; 428/323; 428/326; 428/532; 428/910
[58] Field of Search .................... 428/2, 168, 171, 910, 428/326, 323, 532; 156/62.2, 94; 264/122, 123, 126, DIG. 69; 52/DIG. 9

[56] References Cited
U.S. PATENT DOCUMENTS

| 3,718,536 | 2/1973 | Downs et al. | 156/62.2 |
| 3,927,235 | 12/1975 | Chow | 428/302 |
| 4,013,616 | 3/1977 | Wallace | 428/2 |

*Primary Examiner*—Stanley S. Silverman

*Attorney, Agent, or Firm*—Dann, Dorfman, Herrell and Skillman

[57] ABSTRACT

A method of reclaiming thermoplastic material from municipal waste wherein the thermoplastic material is separated from the municipal waste and is decimated into fragments which are of a size to pass through a screen of a predetermined mesh, for example a mesh with one-half inch openings. Similarly, fallen leaves are kept segregated from other municipal waste and are shredded or similarly decimated so that they may pass through a screen having a predetermined mesh, for example of a mesh comparable to that through which the plastic must pass. The fragments of thermoplastic material and the leaf fragments are blended so as to be thoroughly intermixed, subjected to sufficient heat and pressure so that the thermoplastic material may coat and bond to the surfaces of the leaf fragments and form a unitary mass of leaf fragments and plastic material. The consolidated mass of leaves bonded by the thermoplastic material is then permitted to set and cure so as to be formed into any desired shape. A preferred shape is in the form of particle boards of standard length and width for use in construction and the like.

15 Claims, 2 Drawing Figures

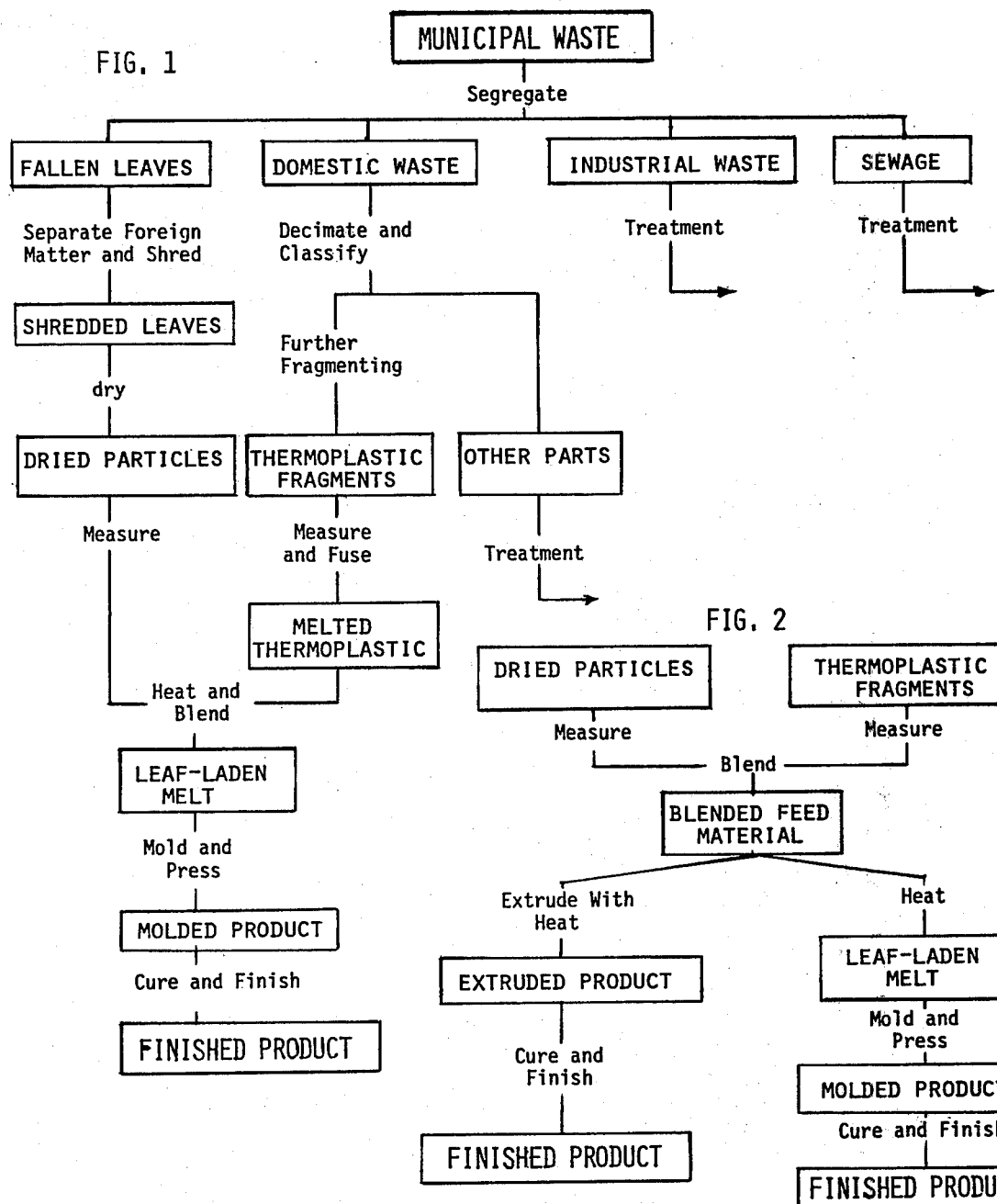

METHOD OF RECLAIMING THERMOPLASTIC MATERIALS FROM MUNICIPAL WASTE AND PRODUCT PRODUCED THEREBY

The present invention relates to a method of reclaiming thermoplastic material from municipal waste, and is particularly applicable to a method wherein all of the principal materials used in the process are derived from municipal waste.

At the present time, particularly in the United States, the disposal of municipal waste is particularly burdensome to municipalities. The burden has been increased by the increasing use of containers made of thermoplastic material which is relatively inert and is not biodegradable as is the case with cardboard, paper and other materials produced from natural products. Glass and metal can be economically recycled since the salvage value of these materials is sufficiently high to justify the segregation and handling which are necessary in a recycling operation. Plastic wastes, however, have not been economically recycled since the manufacturing processes which utilize thermoplastic material require material which is pure and free from foreign matter. A typical batch of municipal waste might include not only containers or other materials of polyethylene, but it normally includes polystyrene jackets and polyvinylchloride materials and various other thermoplastic compositions which are incompatible but are not not readily segregated from one another. Therefore, the plastic material must not only be cleaned and separated from the non-plastic material, but the different types of plastic must be separated from one another. In a recycling operation, there is no satisfactory way in which to separate one plastic material from one another or even to identify the different compositions which are used in making plastic containers and other plastic items.

The present invention provides a method which permits the salvage of the thermoplastic materials without the need for separating the materials having different characteristics. The present invention enables the economic utilization of a batch of thermoplastic material embodying components of different compositions.

Another substantial problem for municipalities and other residential areas in the northern temperate zone is the collection and disposal of leaves falling from deciduous trees. In the past, the general practice was to incinerate the fallen leaves, either in municipal incinerators or simply in leaf piles in the neighborhood. However, in recognizing the polluting effect of burning leaves in open fires and the safety hazards occasioned by open fires, most municipalities have ordained that there shall be no open fires within their boundaries. Banning open fires has then placed the burden upon the municipalities of collecting and disposing of the leaves which were previously burned by the homeowners, each on their own property. While many homeowners will collect the leaves and compost them for subsequent use in their gardens, there are many residents who have no gardens and who do not have any use for compost material or any inclination to conserve natural resources by composting. While some municipalities are able to find a suitable dumping ground for their leaves, the expense of collection and transportation of the leaves to the landfill or other disposal area is tremendous.

Municipally-collected leaves have been used as raw material for the preparation of artificial fireplace logs, but the demand for such logs is not sufficient to use up the vast amounts of fallen leaves which are collected during the autumn season.

The present invention enables effectively utilization of waste materials which are in abundant supply in such a manner that additional fresh material is not needed. The invention produces a material which may be formed into products which are in great demand and which may be used instead of conventional products which are made from fresh natural products or from newly-manufactured material.

More specifically, the present invention provides an intermediate material which is composed of leaf fragments which are bonded into a homogenous material which may be formed into a structure having sufficient strength and rigidity for a wide variety of products.

Specifically, the material produced by the present invention may be formed into particle boards or artificial lumber which is capable of being used in the construction trade in the same manner as conventional particle boards are used and is also capable of use in place of conventional plywood in certain installations.

The invention also enables the use of reclaimed thermoplastic materials to make molded articles which are presently made from newly-made plastic compositions.

All of the objects of the invention are more fully set forth hereinafter with reference to the accompanying drawings, wherein:

FIG. 1 is a block diagram of a method embodying the present invention for producing a finished product by reclaiming thermoplastic material from municipal waste; and FIG. 2 is a block diagram illustrating alternative procedures for producing finished products from thermoplastic fragments and dried particles which have been reclaimed from municipal waste in accordance with the present invention.

Referring now to the drawings, the present invention contemplates the reclamation of thermoplastic material from municipal waste using principally leaf material which is similarly reclaimed from municipal waste. The present invention contemplates that a finished useful product may be made without any substantial use of raw materials other than those materials which are reclaimed from municipal waste.

As discussed above, domestic municipal waste incorporates a wide variety of material, much of which is readily salvaged by recycling. The salvagable material has been limited primarily to glass, metal and newspapers, all of which may easily be maintained separate by the homeowner at the beginning of the salvage process, namely by maintaining these elements separate from the garbage and other components of municipal waste which have no salvage value. The salvage value of metal, glass and newspapers is sufficiently high to justify the separate handling of these materials which is required in a recycling operation.

The balance of the domestic waste consists of food waste, garbage, and containers and packages for food products, and other household items which are not made of glass or metal. Such packages and containers are normally made of paper, either treated or untreated, or plastic, normally thermoplastic resins such as polystyrene, polyethylene and polyvinylchloride materials. The paper products and the food waste which is present in domestic waste are biodegradable and are readily disposed of in municipal waste landfill operations or in other methods where the material is permitted to degrade and is used for fertilizer or other land-enhancement program. The thermoplastic material, however, is not biodegradable and is a detriment to utilization of the municipal waste for land enhancement.

The present invention is designed to separate the thermoplastic material from the municipal waste and provide a method for converting these waste materials into useful products.

One method of reclaiming the material according to the present invention is diagrammatically illustrated in FIG. 1 and includes the step of segregating from municipal waste the domestic waste which includes thermoplastic material. Preferably, domestic wastes and leaves are each collected separately from the industrial waste to avoid contamination of the usable constituents. The domestic waste is then classified to separate out the thermoplastic material.

The preferred method of separating out the thermoplastic material from other domestic waste includes an air-classifier which relies upon the varying densities of materials in the domestic waste to separate out the thermoplastic materials which are characterized by a low density. In an air classification system, it is desirable to have the material reduced to a particle size which is readily handled by the airflow employed to perform the classification. Thus, prior to subjecting the municipal waste to air classification, it normally is subjected to a fragmentation operation or decimation which chops up the large particles in the waste so that the waste is composed entirely of fragments. If desired, to insure improved classification, the fragmented waste may be passed through a screen-separator which will remove large particles which do not pass through the screen. A preliminary step may also include magnetic separation of iron and other metallic components of the waste.

The air classification of the fragmented waste permits separation of the thermoplastic material which is normally in pieces having a relatively thin thickness and which therefore are readily separated out in an air classifier. Thermoplastic material which is in the form of chunks or other large particles may not be separated from the other high-density material, and may not be reclaimed when using an air classifier in accordance with the method of the present invention. The separated fragments of thermoplastic material may then be cleaned and dried, if necessary, and passed through a second fragmentating operation in which the fragments are uniformly reduced to a size that will pass through a given mesh. In the present instance, a one-half inch mesh is desired to insure ease of handling in subsequent operation. Thermoplastic particles of this size are readily stored in a compact space and are not subject to deterioration during the storage period.

The other component which is employed in the reclamation of municipal waste is the leaves which are shed from deciduous trees during the fall of the year. In accordance with the preferred method of the present invention, the leaves are collected separately from the other municipal waste and are not mingled with other municipal waste. However, the collection process normally collects not only leaves, but also collects twigs and small branches and also random trash which may be found in street gutters and other places where leaves are accumulated for pickup in the collection process. Such trash may include discarded beverage containers, papers, and other man-generated trash. Also, depending upon the circumstances, the collected leaves may include nuts, pine cones, and pebbles, as well as the branches and twigs mentioned above.

The collected leaves may be stored in the form in which collected in piles or leaf stacks. When it is anticipated that the leaves will be stored for a prolonged period, they may be baled by conventional hay-baling apparatus. The leaves may be collected and compressed so that there is little opportunity for degradation of the leaves during their storage. It has been found that leaves may be stored for prolonged periods if they are compacted and protected from the weather and from air. The compacted loose leaves or bales may be stored in open piles or stacks which are suitable covered by tarpaulins and the like. In any event, leaves are hygroscopic in nature and during the storage operation, will absorb ambient moisture present in the storage area. Storing the leaves in compacted stacks covered by tarpaulins excludes sufficient air to limit the absorption of moisture by the leaves.

When removed from storage, or when the leaves will be used promptly, the leaves are shredded for subsequent operation. The shredding operation, preferably performed in a commercial leaf shredder, reduces the size of the leaves so that the leaf fragments may pass through a screen or grate having a selected mesh opening. It is preferred that the mesh opening be comparable to the size of the thermoplastic fragments in order to enable the leaves to be consolidated into the smallest storage space possible. Thus, the leaf fragments are of a particle size which will pass through the selected mesh opening, preferably on the order of one-half inch.

The leaves prior to use in the method of the present invention must have a moisture content of less than about ten percent by weight of the bone-dry weight of the leaves. Leaves which have been stored in an arid atmosphere may have a sufficiently low moisture content for use directly from storage. However, in the northeastern section of the United States, it has been found that the hygroscopic nature of the leaves will cause absorption of sufficient moisture to exceed the moisture content which has been found most effective. Accordingly, it has been found desirable to subject the fragmented leaves to a drying operation prior to use in the method of the present invention. The drying operation may be accomplished in various driers, and in pilot operations drying has been accomplished in a roasting oven without substantial airflow through the leaf fragments in the oven.

Using the dried leaf fragments and the thermoplastic fragments as a starting point, the further processing of the material to produce a useful product may follow alternate courses, depending upon the equipment which is available. FIG. 1 illustrates the procedure used in a pilot operation in which there was limited access to process equipment. The procedures of FIG. 2 are deemed to be preferred when the method may be accomplished with ready access to suitable processing equipment.

Depending on the end use of the product which is to be made from the leaf fragments and the fragments of thermoplastic material, they may be combined in different ratios. The higher the ratio of leaf fragments, the closer the end product will simulate natural wood fiber products and the like. Likewise, a high ratio of thermoplastic material will cause the plastic characteristics in the final product to predominate. In pilot operations, the percentage of thermoplastic fragments by weight has been between 15% and 50% of the total weight of thermoplastic material and the leaf material.

In the process, weighed quantities of leaf fragments and thermoplastic fragments are set aside in batches for further processing or, alternatively, the materials may be fed continuously by a metered feeding device of a character suitable for the materials being fed. In the batch process shown in FIG. 1, the dried leaf fragments and the thermoplastic fragments are combined by first fusing or melting the thermoplastic fragments in a retort or other vessel. The thermoplastic fragments include a mix of different compositions of plastic materials and by reason of the nature of the mixed materials, it may not be possible, and is not necessary, to obtain a homogenous blend of the thermoplastic components in the retort or other vessel. While maintaining heat applied to the retort to avoid solidifying of the melted thermoplastic material, the dried particles are blended into melted thermoplastic material so as to thoroughly intermix the leaf particles with the melted thermoplastic material so that the material serves to coat the leaf particles. It is noted that the leaf fragments are plate-like in that they have a small thickness relative to their transverse dimensions of width and length, and the blending of these fragments throughout the melted plastic will coat the exposed surfaces of the leaves with the thermoplastic material. It has been found that the various thermoplastic materials present in domestic waste will adhere to the leaf surface regardless of the particular character of the thermoplastic material. Even though one thermoplastic material may not adhere or bond to another thermoplastic material, the thermoplastic materials do bond to the leaf surface. Thus, as the leaf fragments are blended throughout the body of thermoplastic material, the leaf fragments may serve as a bridge or linking element to integrate different thermoplastic materials into a unitary mass although such materials would not otherwise combine with one another.

When the leaf fragments are thoroughly blended with the melted plastic, the leaf-laden melt is transferred to a mold or similar forming apparatus and in the mold, the melt is subjected to heat and pressure so as to exclude air bubbles and similar voids in the melt and to thoroughly consolidate the melt into a unitary mass. Preferably, heat is applied during the molding operation so as to facilitate consolidation of the mass into a unitary structure, and it has been found that in the molding operation the leaf particles tend to orient themselves into a generally parallel overlapping array so that the particles bond to one another through the medium of the plastic which has been coated onto the particles during the previous operations. As the molded material is compressed, it attains a density which is dependent upon the heat and pressure applied thereto. In the pilot operation, the density in grams per cubic centimeters was in the order of 0.95. This may be compared to plywood which has a density of 0.66 and particle board which may have densities over a wide range of values.

Following the molding operation, the consolidated mass is cooled and cured so as to permit further forming operation. Depending on the nature of the forming operation, it may be commenced prior to complete curing of the material. For example, if it is desired to emboss the surface of the material, this may be done prior to complete solidification of the thermoplastic material. On the other hand, if the material is to be shaped by machine operations, such as sanding, planing and the like, it may be preferred to permit a substantially complete cure prior to subjecting the material to the finishing operation. It should be noted that the curing of the mass does not entail any chemical change of the components, so that the residual wastes in the finishing operation may be returned to the retort for melting and re-processing into finished product. The waste material is also combustible.

In any event, the finishing operation will produce a useful product. For example, a product in the nature of particle board has been produced which has been found to exhibit many of the desirable characteristics of particle board without necessarily including some obvious disadvantages. The material produced in the form of boards by the present invention has shown a very high tensile strength, and breaking strength which is higher than normally experienced in particle board. The product has the same compressive strength, and the nail-ability and saw-ability of conventional particle board. In view of its high strength characteristics, the material may be employed to constitute framing members or structural members for use in the construction industry or elsewhere. The manufactured material has properties comparable to natural lumber without the likelihood of warping or degradation in the presence of moisture. The thorough coating of the thermoplastic material upon the leaf surfaces effectively overcomes the hygroscopic nature of the leaf particles and permits the use of the finished product in moist atmospheres and other installations where prior wood fiber elements cannot be used because of their moisture-absorbing character.

FIG. 2 illustrates alternative processes which are preferred when suitable processing equipment is available. Starting with the dried leaf particles and the mixed thermoplastic fragments of the previously-described embodiment, the ingredients are measured and blended without sufficient heat to cause the thermoplastic material to fuse or become tacky. The blending of the dried material then permits the leaves to be thoroughly intermixed with the thermoplastic fragments. This dried material may then be stored in a loose state for further processing or may be fed directly into apparatus for consolidating and forming the material into useful finished product.

In a continuous forming operation, it is possible to use an extruder to produce articles of indefinite length. The extruder is effective to heat and compress the blended material and form it into an extruded product. The thermoplastic fragments during the extrusion process will fuse and become soft and perhaps even become fluid so that they may adhere to the leaf particles and bond to the leaf particles as a coating. As discussed above, the mixture of different thermoplastic materials may be such that the different materials do not bond or fuse to one another but it has been found that the usual thermoplastic materials in domestic waste will bond or otherwise adhere to the surfaces of the leaf fragments and the leaf fragments will thereby operate as a bridge or carrier link for combining the different thermoplastic materials into a unitary mass.

The flow of the mixture through the extruder is preferably controlled to provide the desired orientation of the leaf particles as they flow so that the product issuing from the extruder consists of leaf particles which are generally disposed in successive overlapping relationship so as to provide a thoroughly integrated unitary mass of leaf particles which are bonded together by thermoplastic material coated thereon. This product may then be cured and finished as discussed above. Since the product of this embodiment is extruded, it may be formed in continuous length with a predetermined width and thickness.

As an alternative to extrusion, the dry mixture of leaf particles and thermoplastic fragments may be fused to form a leaf-laden melt, which may be molded or otherwise compressed and shaped into useful end products, as in the process shown in FIG. 1. The heat applied in this operation may range from room temperature to the degradation temperature of the components of the mixture, but normally the maximum temperature is just above the melting point of the plastic components. The pressures may range from atmospheric up to the limit of the apparatus used for the forming operation.

Thus, the present invention enables the utilization of waste material which is normally discarded and constitutes a disposal problem for municipalities and enables the utilization of these materials to produce a product which may be substituted for products formed of fresh natural material or freshly-manufactured material.

While particular embodiments of the present invention have been herein illustrated and described, it is not intended to limit the invention to such disclosure but changes and modifications may be made therein and thereto within the scope of the following claims.

I claim:

1. A method of reclaiming material from domestic waste comprising the steps of providing a quantity of leaf particles which have a small thickness relative to their transverse dimensions of width and length, combining said leaf particles with a quantity of thermoplastic material of mixed constituents derived from said domestic waste, at least some of said mixed constituents being incompatible, mixing and blending said quantities together and causing the thermoplastic material to fuse and adhere to the leaf particles as a coating bonded thereon, said incompatible constituents of the thermoplastic material being bonded to different parts of the same particles, whereby said leaf particles serve as a bridge to link said incompatible thermoplastic constituents together, consolidating said blended material with heat and pressure to form a product, and thereafter curing and finishing said product to provide a useful end product.

2. A method according to claim 1 wherein said thermoplastic material is in the form of fragments having a size comparable to the size of the leaf particles.

3. A method according to claim 2 wherein the thermoplastic fragments and the leaf particles are both of a size to pass through a mesh of a predetermined size.

4. A method according to claim 2 wherein said quantity of leaf particles and said quantity of thermoplastic fragments are measured to provide a predetermined ratio between said quantities.

5. A method according to claim 1 wherein said leaf particles are dried to about 10% moisture content prior to said mixing and blending step.

6. A method according to claim 1 wherein said quantities are mixed together in a dry state prior to fusing said thermoplastic material.

7. A method according to claim 1 wherein said thermoplastic material is fused prior to mixing with said leaf particles.

8. A method according to claim 1 wherein said thermoplastic material is fused by heating at a temperature and pressure to cause the thermoplastic to melt without degrading and without damaging the leaf particles.

9. A method according to claim 1 wherein said quantity of thermoplastic material is separated from the domestic waste by decimating the domestic waste and separating the thermoplastic parts thereof by air-classification according to the density of decimated particles.

10. A method according to claim 9 including the step of removing foreign matter from said decimated waste material prior to subjecting the material to air classification.

11. A useful product made by reclaiming material from domestic waste comprising a formed body consisting essentially of leaf particles and thermoplastic material having a variety of constituents, at least some of which are incompatible, said leaf particles having a small thickness relative to their transverse dimensions of width and length and being disposed in successive overlapping relationship and being coated with said thermoplastic material, said thermoplastic bonding to said leaf particles and effectively bonding said leaf particles together into a unitary mass where the particles overlap, and the incompatible constituents being coated onto different parts of the same leaf particles whereby said leaf particles link said incompatible thermoplastic constituents together.

12. A useful product according to claim 11 wherein said leaf particles are substantially parallel to one another and are disposed in face-to-face confronting relation with the thermoplastic material therebetween.

13. A product according to claim 11 wherein said product is in the form of a board of predetermined length, width and thickness.

14. A product according to claim 11 wherein said product is in the form of a structural element of predetermined width and thickness formed in continuous length.

15. A method according to claim 1 including the step of deriving the entire quantity of thermoplastic material entirely from said domestic waste.

* * * * *